Oct. 15, 1929.                P. MORIN                1,731,933
CROSSCUT SAW JOINTER
Filed Feb. 26, 1927
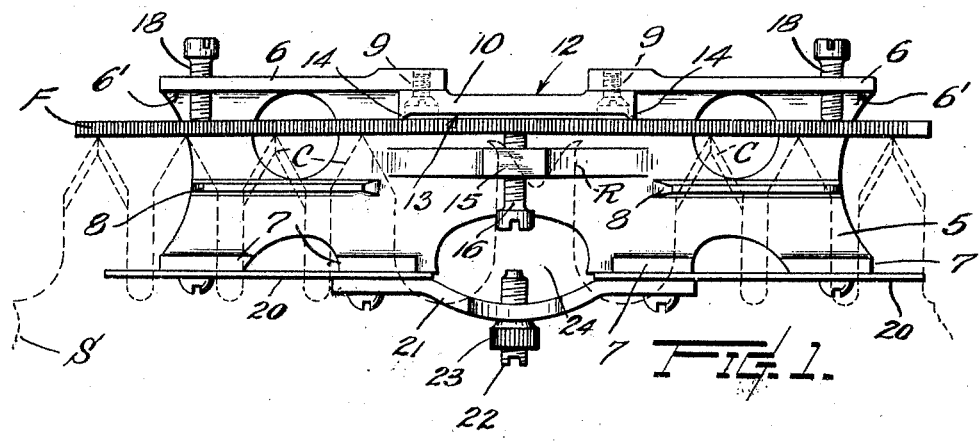
INVENTOR:
Philiace Morin
BY
Pierre James
ATTORNEY Patented Oct. 15, 1929

1,731,933

UNITED STATES PATENT OFFICE

PHILIACE MORIN, OF SEATTLE, WASHINGTON, ASSIGNOR TO MORIN SAW GAUGE MANUFACTURING CO., OF SEATTLE, WASHINGTON, A CORPORATION OF WASHINGTON

CROSSCUT-SAW JOINTER

Application filed February 26, 1927. Serial No. 171,115.

This invention relates to a combined gage and jointer for crosscut-saws; and its object is the improvement in tools of this character to render the same more accurate and convenient to operate in correcting the raker teeth and in finishing the cutting teeth to terminate in a circular arc best adapted for felling trees and cutting the same into saw logs.

The invention consists in the novel construction, and combination of devices hereinafter described and illustrated in the accompanying drawing, and particularly set forth in the appended claim.

In said drawing,—

Figure 1 is a front elevation of a saw tool embodying my improvements, illustrated as applied to jointing cutter teeth of a saw which is indicated in dotted lines; Fig. 2 is a plan view of Fig. 1; and Fig. 3 is an end elevation of the same.

The tool constituting the present invention comprises a body or frame having a vertical web element 5 provided along its upper edge with two horizontally spaced apart flanges 6. Along its lower edge the frame is provided with flanges 7 and intermediate said upper and lower flanges 6 and 7 the frame is provided with ribs 8 adjacent the ends of the frame web 5. The flanges 7 and ribs 8 are of less width than upper flanges 6, the outer edges $7^1$ and $8^1$ of the respective flanges and ribs terminating in a plane at right angles to the plane of the under surfaces $6^1$ of the flanges 6.

Secured to the under sides of the flanges 6, as by means of screws 9 engaging in threaded holes thereof is a block 10 extending across the gap between the inner ends of the flanges 6.

Said block is formed to provide a longitudinal slot 11 to receive a raker tooth R of a saw blade, indicated by dotted lines S in Fig. 1, when the points of the adjacent cutting teeth C bear against the flange surfaces $6^1$.

The block 10 is recessed above to afford between the flanges 6 a surface 12 in a plane parallel with and below the plane of the flange surfaces $6^1$ equal to the difference desired between the cutting and raker teeth, which is accomplished by filing a raker tooth extending through the slot 11 of said block down to the plane of the surface 12 when the saw blade is held against the flanges 7 and ribs 8 and with the points of the cutting teeth C at opposite sides of a raker tooth R in contact with the surfaces $6^1$.

The under side of the block 10 is also formed to provide a recess 13 between downwardly directed ridges 14, one at each end of the block. Below said block on the tool frame is a lug 15 which is provided with a threaded hole for engaging the threads of a screw 16 having a slotted head at its lower end and a plane upper end. This screw 16 is disposed at right angles to the plane of the under surfaces of the block ridges 14 and midway between the same. According to the present invention I provide, in close proximity to the ends of the tool, screw threaded holes in the flanges 5 which are engaged by the threads of screws 18, hereinafter termed the regulating screws, the parts of such screws below the flanges being located in the space between the tool web 5 and the plane of the flange and rib surfaces $7^1$ and $8^1$, respectively.

In the use of the tool for jointing the points of the cutting teeth C of a saw a "flat" file indicated by F is employed as shown in Fig. 1—that is to say, the file centrally of its length is pressed upwardly by means of the screw 16 to bear at each side of the latter against the ridges 14 at the ends of the block 10 until the file is bent slightly into the recess 13 in the underside of said block.

Thus affected the file at opposite sides of said block are substantially straight. To remedy this defect the regulating screws 18 are utilized to cause the ends of the file to be forced downwardly to extents to cause the file to assume the curvature of a circular arc, or practically so.

The curvature of the file may be set to suit the eye of an experienced workman, or a template of wood or other material may be made with an arcuate edge to try against the file until the latter is satisfactorily regulated.

It is to be noted that the file has four bearing surfaces above—that is, the two spaced apart block ridges 14 near the middle and the adjustable regulating screws 18 near the ends of the tool—which act counter to the master screw 16 engaging against the underside of the file.

The symmetrical disposition of the fixed and adjustable bearings 14 and 18, respectively, above the file with respect to the adjustable bearing 16 below the file, not only provide suitable supports but also facilitate the setting of the file to a desired curvature, as is most advantageously done by adjusting the screw 16 alternately with the regulating screws 18.

Excepting for the plates 20, the bridge 21, with the gage screw 22, and its lock nut 23 are substantially similar in construction and function to corresponding parts illustrated and described in U. S. Patent 1,175,546, dated March 14, 1916, in which there is disclosed a single plate which extended across the sight opening 24 in the frame web making it difficult for a saw filer to determine whether or not the screw 22 is in gaging relation with respect to raker tooth being tested.

In such testing, the cutting teeth are brought against the plates 20, as will be understood by saw filers and others skilled in the art.

The provision of an unobstructed view of the work which is afforded by the elimination of a bar or plate spanning the opening 24 is of importance in regulating the teeth of saws for accurate and rapid sawing operations.

What I claim, is,—

In a saw jointer, the combination with the body having a vertical web provided along its upper edge with two spaced apart flange elements, each of said flange elements being provided with a screw threaded hole in proximity to the opening between the flanges and a screw threaded hole in proximity to the respective ends of the body, means protruding from said web in spaced relation vertically and horizontally of the body to serve as a side support for a saw blade, and a lug protruding laterally from said web at about the midlength of the body, said lug being provided with a screw threaded hole, of a slotted block provided at each end thereof with a downwardly directed ridge, screws extending through said block into engaged relation with the first named holes of the respective flanges for securing the block thereto, a screw extending upwardly through the threaded hole of said lug and adapted to engage against a file and cooperate with said ridges to clamp the file to the body and impart an arcuate shape to the file intermediate said ridges, and screws engaging in the second named holes of said flanges and engaging against the file in proximity to the ends of the body to impart regulated amounts of curvature to the file at opposite sides respectively of said block.

Signed at Seattle, Washington, this 5th day of February, 1927.

PHILIACE MORIN.